(12) United States Patent  (10) Patent No.: US 8,460,002 B2
Wang et al.  (45) Date of Patent: Jun. 11, 2013

(54) LAPAROSCOPIC TRAINER AND METHOD OF TRAINING

(76) Inventors: Shyh-Jen Wang, Taipei (TW); Taiwai Chin, Taipei (TW)

( * ) Notice: Subject to any disclaimer, the term of this patent is extended or adjusted under 35 U.S.C. 154(b) by 1282 days.

(21) Appl. No.: 11/550,413

(22) Filed: Oct. 18, 2006

(65) Prior Publication Data

US 2009/0142739 A1    Jun. 4, 2009

(51) Int. Cl.
    G09B 23/28    (2006.01)
(52) U.S. Cl.
    USPC .......................................................... 434/262
(58) Field of Classification Search
    USPC ..................... 434/262, 267, 272; 600/112
    See application file for complete search history.

(56) References Cited

U.S. PATENT DOCUMENTS

| 5,810,712 A * | 9/1998 | Dunn | 600/114 |
| 6,659,776 B1 * | 12/2003 | Aumann et al. | 434/262 |
| 6,902,405 B2 * | 6/2005 | Irion et al. | 434/272 |
| 8,007,281 B2 * | 8/2011 | Toly | 434/262 |
| 2005/0064378 A1 * | 3/2005 | Toly | 434/262 |
| 2005/0142525 A1 * | 6/2005 | Cotin et al. | 434/262 |

* cited by examiner

Primary Examiner — Xuan Thai
Assistant Examiner — Peter Egloff

(57) ABSTRACT

A surgical training device for the practice of surgical techniques comprises a base and a face wall extending from a side of said base such to block direct visualization of the operation area from the normal external position of the eyes of the trainee using the device. The face wall comprises a front wall and an upper wall. The front wall is extended upwardly from the base; the upper wall is then extended upwardly and inwardly from the front wall. A flexible membrane is stretched on upper wall and has at least two portals such that adaptors can be inserted on flexible membrane. The adaptors are further fitted with stoppers to prevent adaptors been pulled out from the membrane during training. The surgical instruments can pass through the openings of adaptors to manipulate simulated tissue or another operable structure on the base. A plain spherical bearing set, including a bearing seat and a plain spherical bearing, is also installed on said upper wall. The bearing seat has a bearing hole to interference fit with plain spherical bearing and two bolt holes to hold bearing seat on upper wall such that a camera handle can pass through plain spherical bearing to catch the image on base.

13 Claims, 6 Drawing Sheets

LAPAROSCOPIC TRAINER AND METHOD OF TRAINING

FIELD OF THE INVENTION

The present invention relates to surgical training, and particularly to a structure for use in learning laparoscopic surgical techniques.

BACKGROUND OF TOE INVENTION

In recent years, many invasive surgical and operative medical procedures have been developed utilizing laparoscopic techniques. The laparoscopic can reduce the trauma and recuperative periods associated with prior conventional surgical techniques. To date, the laparoscopic procedures have been developed for a wide variety of gynecological, chest, abdomen and urologic procedures, to place feeding tubes into the digestive tract, to take biopsies, to inspect for tumors, and to correct some types of infertility, by way of example. Additional techniques may be developed including laparoscopic techniques for sinus surgery, esophagus repair, fetal surgery and prophylactic breast cancer surgery. Basically, the laparoscopic entails inserting instruments through a small incision into an operative cavity. A narrow video camera is also inserted to guide the surgeon in manipulation of the laparoscopic instruments.

For example, operations which take place in the abdomen are carried out by inserting trocar stops through the abdominal wall and peritoneum. A trocar supplied with air or an inert gas is inserted into the trocar stop, and gas flow is commenced to inflate the peritoneum. Video cameras and instruments are then inserted through the trocars to carry out the operation. However, unlike the conventional techniques, the surgeon is not able to rely on his or her sense of feel and direct tactile response during laparoscopic surgery. Further, visual response is limited to the two-dimensional image viewed through the laparoscopic video output, in which many structures may look similar. Depending on the orientation of the laparoscopic video camera relative to the organ or other anatomic structure being laparoscopically manipulated, the surgeon may see only an anterior image of the instruments and anatomic structure, or only a posterior image of the instruments and anatomic structure. If is thus critical that surgeons are taught and then maintain laparoscopic skills that help them to identify structure and to carefully control the laparoscopic instruments to ensure that a surgical procedure is accurately performed without, causing unnecessary damage to surrounding tissue.

Especially, many laparoscopic surgeries require suturing and knot tying to close incisions made during surgery. Typically, a double-ended needle secured to the end of a suture thread is manipulated by instruments during suturing. Suturing and knot tying via endoscopy are techniques that require great skill and precision.

Conventional methodologies for teaching laparoscopic surgery procedures involve the use of animal specimens. The use of laboratory animals for surgical training is very expensive and is sometimes also subject to popular debate. Additionally, animal specimens have a short viability on the operating table, and thus provide the trainee with a limited period of time in which to practice repeated techniques.

As an alternative to conducting animal trainings, the surgical training devices, maybe also called simulator, have been developed. The earlier model made and widely used training device were built in Germany and one such device is called Semm Pelvi-Trainer. This simulator has a transparent panel on top with several openings where instruments and viewing scope are inserted and manipulated. It is provided with a method of holding organs which are suspended from the top panel using bead chains and clips. The exercise procedures are performed on living tissues like placenta or even muscle. Though these devices have prominent features, they also have significant drawbacks. This particular model was primarily constructed for training Gynecologists so that simulation of laparoscopic operative techniques are geared and limited to the pelvic organs, thus it is appropriately named 'Pelvi-Trainer'.

Although this simulator functions satisfactorily in most cases, it tends to suffer from several problems which limit its usefulness. One such drawback is that, if encourages the use of Pelviscope. Endoscopes are expensive and are not readily available to many surgeons much less to the initiates.

Yet another drawback of the Pelvi-Trainer is that, when the surgeon uses the Pelviscope, she/he actually carries out the simulated instrumentation and practice procedures under direct monocular vision. This type of vision as applied in endoscopic surgery has been replaced by Endoscope-Video-Monitor System which operates under indirect binocular vision, a system that is being used in actual live laparoscopic operations and in some other training devices.

Still another drawback of this simulator is that, it has only one plastic panel with multiple openings that are positioned primarily for practice procedure on the pelvic cavity. It has no provision for practice simulation in the other body cavities like the chest, upper abdomen and the region of the kidneys. Furthermore, the simulator with a transparent panel on top is quite different from the real one.

Additional drawback of the Pelvi-Trainer is that, in the practice of simulation, the trainee can only use human tissue like placenta or animal parts. These materials are not readily available and their procurement might be difficult.

Another simulator that was brought out to the public is the U.S. Pat. No. 5,149,270 invented by Mckeown. This is an apparatus that has all its sides of black plexiglass making the inside cavity pitch-dark. This device apparently functions substantially identical in some aspects to the Semm Pelvi-Trainer. One drawback that is very evident is that, the trainee has to use the apparatus with the aid of a scope which provides a magnified direct monocular vision similar to the Semm Pelvi-Trainer.

Yet another drawback of this apparatus is that, it has provision only for practice simulation on materials like animal parts or even human tissue which are suspended from the top plexiglass panel by chain beads and clips, a method exactly similar to the Semm Pelvi-Trainer.

The top lid plexiglass of the McKeown apparatus has multiple puncture positions that are appropriately used for simulation practice exercise on limited organ location, i.e., the placement and location of the apertures on the top lid is not suitable for practice simulation of laparoscopic surgery on the chest or in the region of the kidneys and this is also a drawback of the device.

Still another drawback; of this training apparatus is that, the trainee must always use an endoscope to perform practice simulation. The endoscope is an expensive item and not readily available to most trainees, therefore the use of such apparatus is limited to hospital setting where the endoscope might be accessible to the trainee.

Another drawback of this device is that, the mounting of the organ object being practiced on is by clamps on bead chains suspended from the top plexiglass panel which makes the object a moving target and would need a steady hand to perform simulated delicate sewing technique. It may result in learning a difficult but not necessary technique.

The U.S. Pat. No. 5,425,644 further disclosed an apparatus including a frame, a pump, appropriate tubing and a reservoir containing a volume of fluid to closely replicate clinical phenomena. The U.S. Pat. No. 5,425,644 apparatus mainly focused on the phenomena inside the frame. However, the property of the surgical instruments inserting into the apparatus is quite different from the real status.

Similar to the problem mentioned above, the U.S. Pat. No. 5,403,191 has the surgical instruments insert into the cavity with objects simulating human organs through the pre-established apertures on the transparent plastic panel. The apertures of the U.S. Pat. No. 5,403,191 are covered with a resilient pressure sensitive circular foam rubber plates and at the center of these plates are small openings through which the trocar and instruments are inserted during practice procedure. Another smaller circular pressure sensitive plate covers the aperture and attached to the under surface of plate, thus reinforcing the holding strength of plate against the in and out movement of the trocars. The U.S. Pat. No. 5,403,191 disclosed a resilient pressure sensitive circular foam rubber plates as well as the trocars on the transparent plastic panel, which is quite different from the real situation in transparency and hardness properties. Furthermore, the smaller circular pressure sensitive plate, reinforcing the holding strength of plate against the in and out movement of the trocars, may still cause the trocars to be pulled out.

The U.S. Pat. No. 5,722,836 also mentioned that apertures are defined as holes to simulate incisions in operative cavities. If desired, a trocar stop (not shown) may be inserted into a flexible elastomeric cover (not shown) placed over each aperture, and a trocar (not shown) may be inserted into the trocar stop. Surgical instruments may then be inserted through the trocars for increased realism in the training provided. However, the inventor of the U.S. Pat. No. 5,722,836 only mentioned the concept, but not enabled the desire so to leave the trocar stop, flexible elastomeric cover and trocar be not shown in his specification.

The U.S. Pat. No. 5,947,743 disclosed a membrane, stretched across a frame, to define a membrane module, which is removably held in place by buckles on the top wall to cover the access opening and simulate human tissue. The membrane may allow the medical instruments to be directed therethrough. However, even with the membrane with flexibility, the training realism is still fallen behind in that the membrane material always would not provide radial movement.

The U.S. Pat. No. 6,887,082 trainer depicted the portals to be inserted laparoscopic instruments, such as trocars, cannulas, clamps, and scissors, into the chamber so that surgeons can manipulate tissue, or another operable structure, positioned in the tray. However, the problems of support wall without flexibility and trocars to be fallen out still existed in the U.S. Pat. No. 6,887,082.

There are also several articles published in journals related to the laparoscopic trainer, such as: Ricchiuti D et al. "A simple cost-effective design for construction of a laparoscopic trainer", Journal of Endourology 2005 Vol 19(8) pp 1000-1005; Anthony JR. et al. "How to build your own laparoscopic trainer", Journal of Emdourology, 2005 Vol 19(6) pp 748-753; Pokorny M R et al. "inexpensive home-made laparoscopic trainer and camera", ANZ J. Surg, 2004 Vol 74, pp 691-693; Chung S T et al. "Laparoscopic skills training using a webcam trainer", Journal of Urology, 2005, Vol 173, pp 180-183; Beatty J D "How to build an expensive laparoscopic webcam-based trainer", BJU International, Vol 96, pp 679-682; Sharpe BA et al "Randomized comparison of standard laparoscopic trainer to novel, at-home, low cost, cameraless laparoscopic trainer", Urology, 2005, Vol 66(1), pp 50-54. Most of the trainers depicted in these articles were also disclosed in the patents mentioned above. Among them, the article presented by Ricchiuti et al. described a 3.0×3.0×⅛-inch Neoprene rubber gasket with a ½-inch diameter hole to be accessed by a standard 10 to 12-mm laparoscopic trocar. It might be help to keep the trocar with the gasket. However, the trocars are still very possible to be pulled out during manipulating the laparoscopic instruments.

There thus exists a need for systems and methods to train surgeons in laparoscopic techniques that provide low-cost, realistic opportunities to practice endoscopic manipulation and surgical procedures. In order to make this training most effective, trainees should be provided with realistic visual and manipulative feedback during training.

SUMMARY OF THE INVENTION

The present invention provides an apparatus for laparoscopic surgical training. The surgery trainer basically comprises a face wall and a base. The face wall structure blocks a trainee's direct line-of-sight view of the simulated anatomical structure on the base. Furthermore, the trainer equips with a flexible membrane stretched on the face wall. There are two apertures on the flexible membrane from which trocars, cannulas or reducer caps can be inserted through the membrane. In the middle of these two apertures, there is another aperture on the face wall to pass through the camera for catching the image on the base.

According to one aspect of the present invention, the surgery trainer further provides a stopper for each trocar or reducer cap to prevent it be pulled out. The stopper has an inside dimension to be fitted on the trocar or reducer cap and an outside dimension, which is greater than the size of aperture so that the trocar or reducer cap would not be pulled out the membrane after fitting with the stopper.

According to another aspect of the present invention, the apertures of the trocars of the surgery trainer are on the flexible membrane. The flexible membrane simulates the human tissue such as the abdominal wall. Therefore, the trainees should feel a very realistic manipulative feedback during training.

The present invention provides an endoscopically surgical trainer that realistically simulates a surgeon's view of an laparoscopic surgery site at a low cost. According to one embodiment of the present invention, the laparoscopic surgery trainer includes a camera handle passing through the aperture on the face wall. The camera, is installed in front of the handle to catch the image of a simulated anatomical structure on the base. Following, the image signal can be transmitted to and shown on a screen. The feature of image displayed is very similar to that of real laparoscopic system.

According to another embodiment of the invention, the surgery trainer further provides a plain spherical bearing set on the face wall. Thereby, the camera can be adjusted in and out as well as different orientation angles. Furthermore, the handle can locked in place so that the trainees can perform the trainer by herself/himself without the help by others.

According to another aspect of the present invention, the routine skills such as laparoscopic suturing and knot tying can be repeatedly practiced by trainees on a low-cost laparoscopic surgery trainer. The present invention thus provides an opportunity for training to develop realistic laparoscopic surgical skills.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
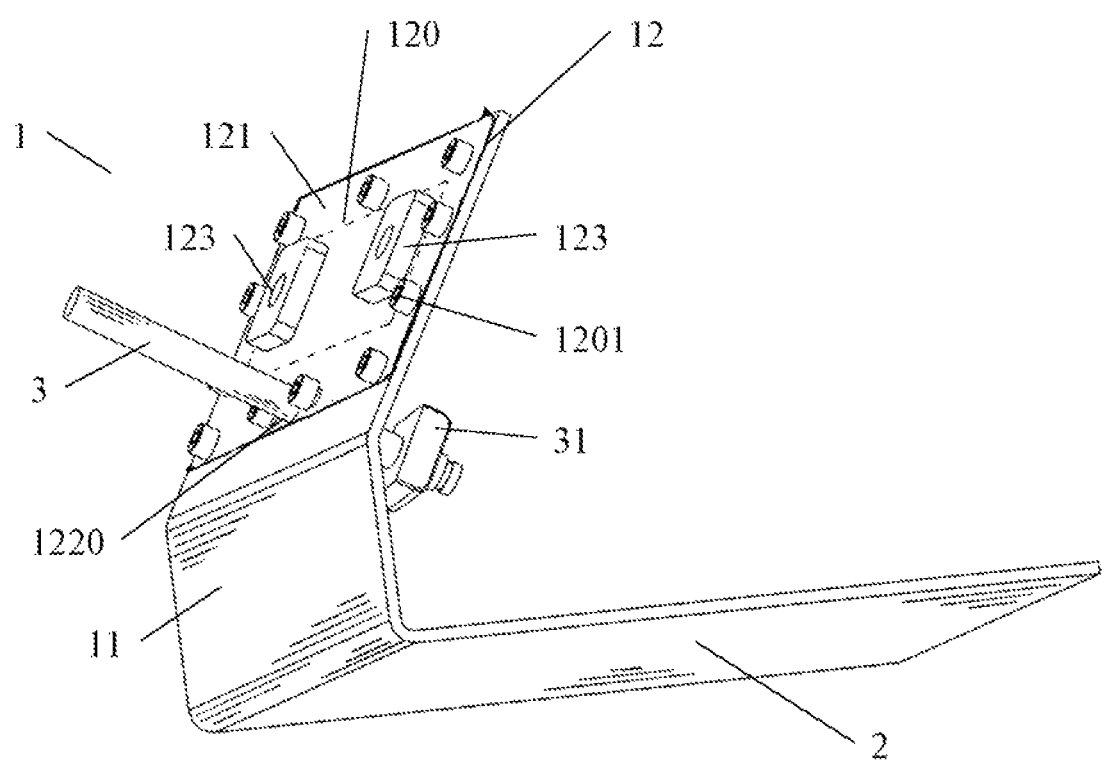
FIG. 1 provides a three-dimensional view of a laparoscopic surgical trainer system constructed in accordance with the present invention.

A trainer for surgeons to learn and practice laparoscopic surgical procedures is depicted generally in FIG. 1. The device comprises a face wall 1 and base 2. The base 2 is arranged to receive an operable structure. The face wall 1 is extended upwardly from a side of the base 2. The face wall 1 and base 2 both are basically formed from an opaque material. It will be appreciated that in other embodiments, the base 2 and a front wall 11, extended upwardly from the base 2, of the face wall 1 could be also formed from a transparent material. Extending upwardly and inwardly from the upper edge of the front wall 11 is an upper wall 12 of the face wall 1. The angle of the upper wall 12 relative to front wall 11 is greater than 90 degree. The angle is frequently set between 110 degree and 165 degree. The preferable angle is around from 120 degree to 160 degree. The most preferable angle is around from 130 degree to 150 degree. The position and orientation of the upper wall 12 of the face wall 1 is such to block direct vision of the operation area from the normal external position of the eyes of the trainee using the device. Another embodiment is to add a top wall, which is extended from the upper wall 12 and is about to parallel with the base 2 for better blocking direct vision of the operation area on the base.

Figure 2:
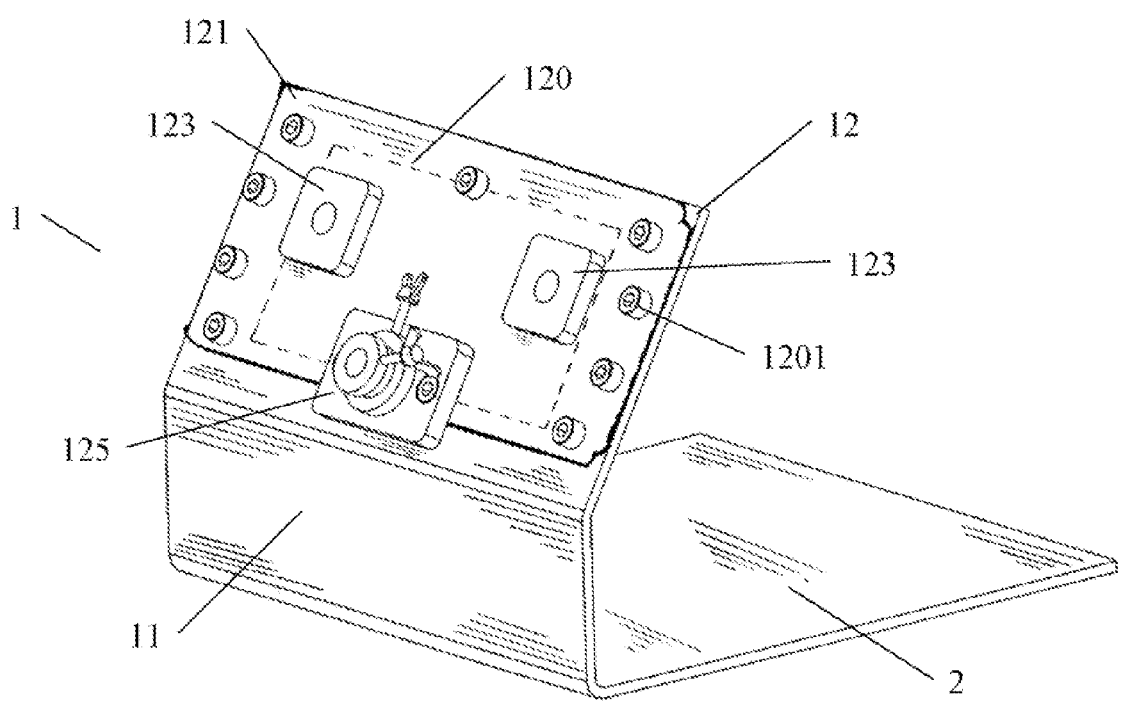
FIG. 2 provides a three-dimensional view of another embodiment of a laparoscopic surgical trainer system constructed in accordance with the present invention.
Figure 3:
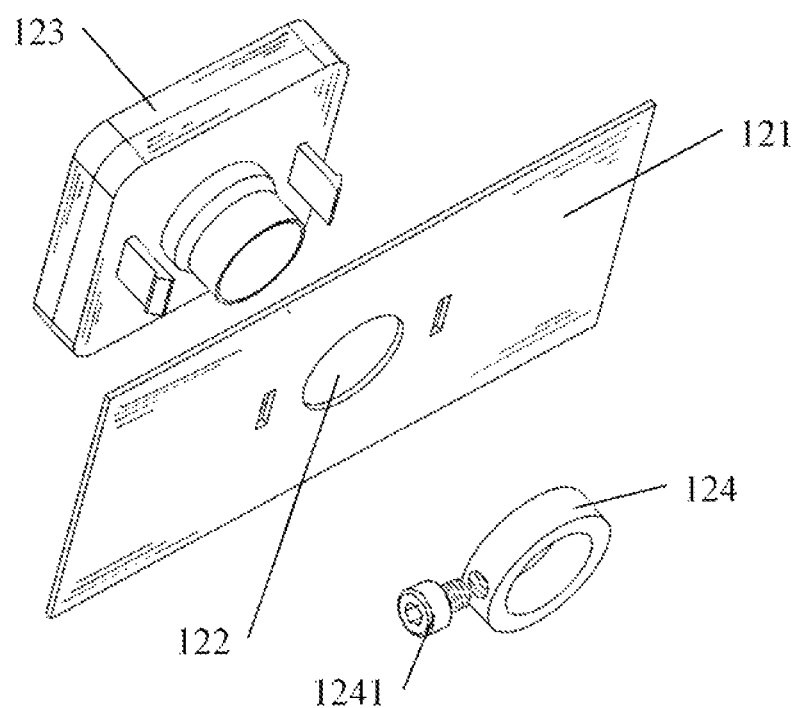
FIG. 3 provides an enablement of the stopper for the adaptor.
Figure 4:
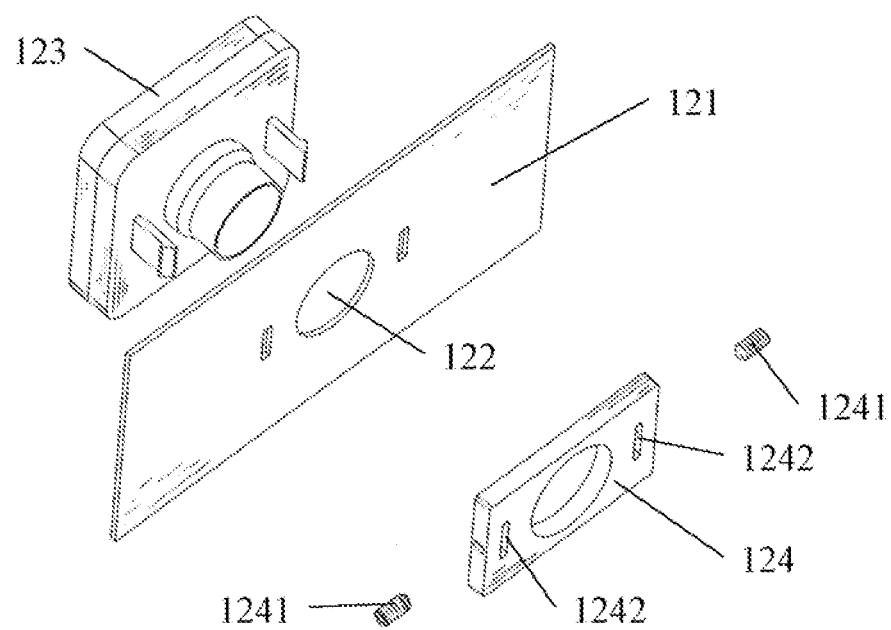
FIG. 4 provides another embodiment of the stopper for the adaptor.

In the depicted embodiment, the upper wall 12 of the face wall 1 has a cutout 120 (as the dot line indicated in FIG. 1 and FIG. 2). Over the cutout 120, a flexible membrane 121 is attached on the upper wall 12 by bolts 1201 (as shown in FIG. 1 and FIG. 2), rivets, staples or glue, to simulate human tissue such as abdominal wall. The flexible membrane 121 is normally made of soft material such as rubber or plastic. A strip piece or washer (not shown in the figures) can be further added between the bolts 1201, staples or rivets and the flexible membrane 121 to press the membrane more evenly. The flexible membrane 121 of the upper wall 12 has at least two adaptor portals 122, separated apart around from 120 mm to 400 mm. The preferable distance of the two instrument, portals 122 apart is around from 130 mm to 250 mm. The most preferable distance of the two instrument portals 122 apart is around from 140 mm to 200 mm. Other positions and different numbers of instrument portals can be envisaged. As depicted in FIG. 3, the portals 122 allow the trainee to insert laparoscopic adaptor 123, such as trocars, cannulas or reducer caps (as shown in FIG. 3) into the flexible membrane 121. After inserting the adaptor, a stopper 124, which has an outside dimension greater than the size of portals 122 and has an inner dimension to be fitted on the adaptor 123, is to prevent that trocars, cannulas or reducer caps be pulled out from the membrane during using the trainer. The stopper 124 can be interference fitted or/and secured with a bolt 1241 as shown in FIG. 3. FIG. 4 demonstrated another embodiment of stopper 124, which has two cutouts 1242 to be better fitted with the reducer caps 123 and secured with two bolts 1241.

Following, the trainee can insert surgical instruments into the trainer through adaptors 123 to manipulate simulated tissue or another operable structure on the base 2. It should be mentioned that the structure of present invention, surgical instruments passing through trocars, cannulas or reducer caps on a flexible membrane, is quite similar to the arrangement used in real endoscopic surgery. Therefore, the present invention thus can provide an opportunity to develop very realistic laparoscopic surgical skills.

In the middle position of the two adaptor portals 122, a camera hole 1220 is set on the face wall 1 to allow the camera handle 3 to be adjusted in and out for catching the image of operable structure on the base 2. Another embodiment of the invention is to fix the camera on the face wall 1 to catch the image of operable structure on the base 2.

Figure 5:
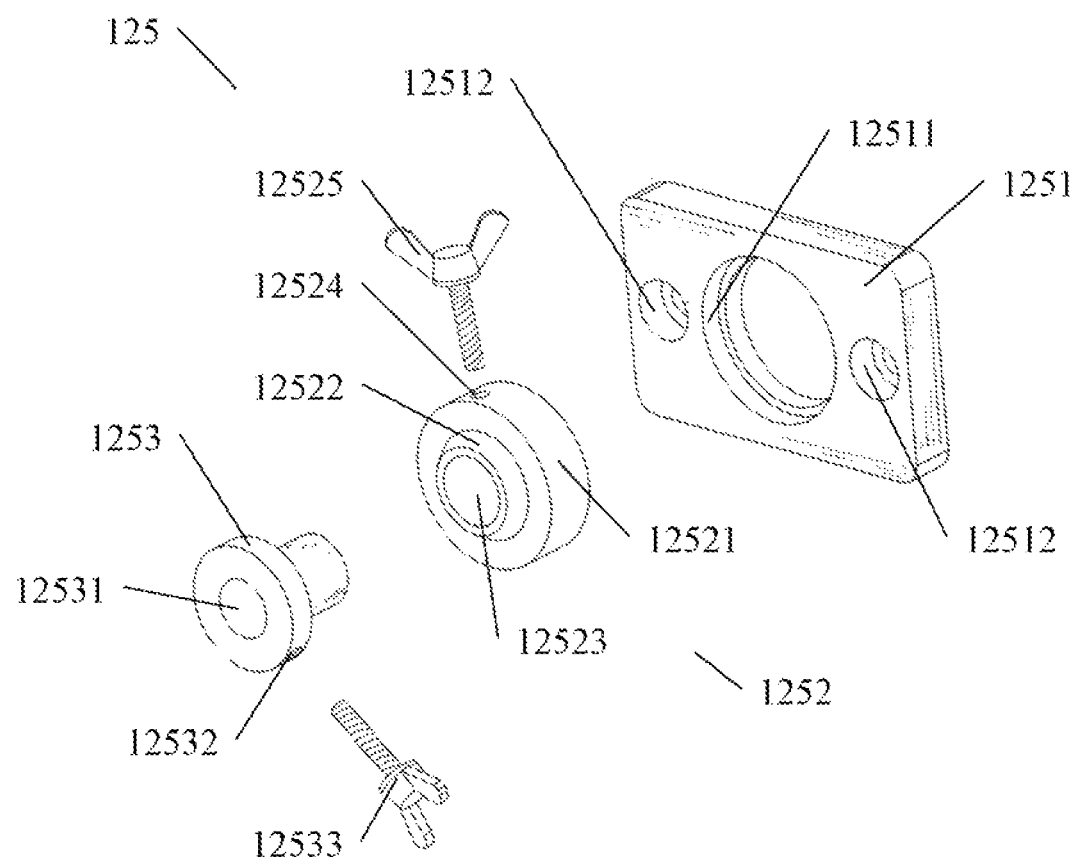
FIG. 5 provides an exploded view showing the elements of the plain bearing set.

As shown in FIG. 2, another embodiment of present invention is to have a plain spherical bearing set 125 installed over camera hole 1220 of the upper wall 12 but below flexible membrane 121. Of course, the plain spherical bearing set 125 can also be set on the flexible membrane 121. However, installing the plain spherical bearing set 125 on the upper wall 12 is preferred. Basically, the plain spherical bearing set 125 includes a bearing seat 1251 and a plain spherical bearing 1252. The bearing seat 1251 has a bearing hole 12511 to be interference fitted with the plain spherical bearing 1252 and bolt holes 12512 to hold the seat 1251 on the upper wall 12. The plain spherical bearing 1252 which is quite available at hardware stores has an outer ring 12521, inner spherical ring 12522 and shaft hole 12523. The inner spherical ring 12522 can be rotated in the outer ring 12521 to adjust the orientation needed. A part of the outer ring 12521 is interference fitted with the bearing hole 12511 of the bearing seat 1251. The other part of the outer ring 12521 has a thread hole 12524. Thereby the bolt 12525 can fix the orientation of the plain spherical bearing 1252. A camera handle 3 can be adjusted in and out through the shaft hole 12523 of the plain spherical bearing 1252 to catch the image on base 2. As shown in FIG. 5, it is preferred to have sleeve 1253 interference fitted in the shaft hole 12523 of the plain spherical bearing 1252. The sleeve shaft hole 12531 of the sleeve 1253 can allow the camera handle 3 to be adjusted in and out. Furthermore, a thread hole 12532 of the sleeve 1253 can have a bolt 12533 to fix the camera handle 3 in place.

Figure 6:
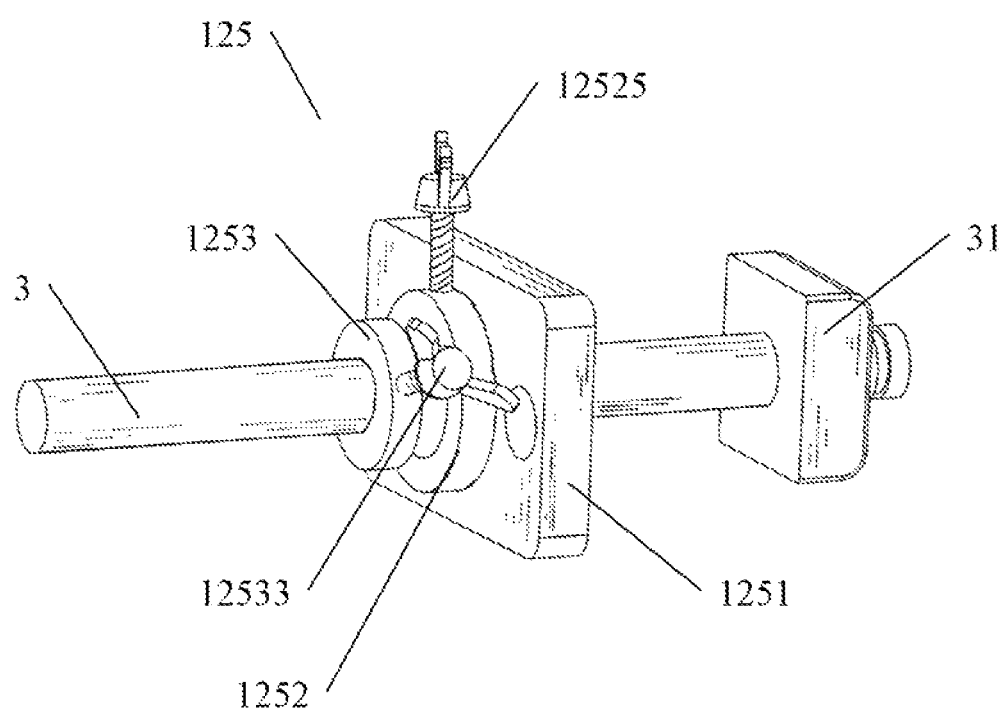
FIG. 6 provides a perspective view of the plain bearing set assembled with a handle and camera.

FIG. 6 is a perspective view of the camera handle 3 with a camera and the plain spherical bearing set 125. The camera handle 3 is clearance fitted into sleeve shaft hole 12531 of the sleeve 1253 on the plain spherical bearing set 125. Thereby, a camera handle 3 can be adjusted in and out through the plain spherical bearing set 125. The camera 31, which can be Webcam, hidden camera or CCD, is installed in front of the handle 3 to catch the image of a simulated anatomical structure on the base 2. Due to the function of plain spherical bearing set 125, the camera can be adjusted in and out as well as different orientation angle by manipulating the handle 3. Furthermore, there is a bolt 12533 on plain spherical bearing set 125 to fix the camera handle 3 in the forward and backward position and the other one 12524 to fix the plain spherical bearing 125 in the orientation angle needed. Therefore, the handle 3 can be locked in place so that the trainee can perform the trainer by herself/himself without the help by others. Following, the image signal can be transmitted to and shown on a display screen (not shown). The feature of image displayed is, therefore, very similar to that of real laparoscopic system.

The present device serves to provide a trainee with a two-dimensional image of an operation area on the base 2 through use of a camera to display the image on a screen. An appropriate sample of body tissue, human or animal or a synthetic operable structure, can be placed on the base 2. By only being able to view two-dimensional image of the sample on a screen, the trainee is required to operate in an equivalent manner to that necessary in actual laparoscopic surgery. Furthermore, the structure of present invention, having the surgical instruments pass through trocars, cannulas or reducer caps on a flexible membrane, is quite similar to the arrangement used in real endoscopic surgery. Therefore, the present invention thus can provide an opportunity to develop very realistic laparoscopic surgical skills.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. While the preferred embodiment of the invention has been illustrated and described, it will be appreciated that various changes can be made therein without departing from the spirit and scope of the invention.

The present invention is superior to the laparoscopic training device previously developed with the following advantages: First, the structure of present invention, including surgical instruments passing through an adaptor 123 on a flexible membrane 121, can provide an opportunity to develop very realistic laparoscopic surgical skills. Second, the flexible membrane 121 simulating the human abdominal wall can provide very similar situation as the real laparoscopic surgery. Third, a stopper 124 is fitted on the adaptor 123 to prevent adaptor 123 be pulled out from the membrane during training. Fourth, the image of a simulated anatomical structure on the base 2 can be roomed in and out by pushing the camera handle 3. Fifth, the orientation of the camera can also be adjusted by rotating the inner spherical ring 12522 in the outer ring 12521. Sixth, the handle can be locked in place so that the trainee can perform the trainer by herself/himself without the help by others.

We claim:

1. A surgical training device for practicing surgical techniques comprising:
    a base, said base being arranged to receive an operable structure;
    a face wall, extending from a side of said base such to block direct vision of the operation area from the normal external position of the eyes of the trainee using the device, said face wall comprising a front wall and an upper wall, whereby the front wall extended upwardly from the base, and the upper wall extended upwardly and inwardly from the front wall, said face wall having a camera hole, and said upper wall having at least a cutout to be covered by flexible membrane;
    a flexible membrane, stretched on upper wall to cover the cutout on upper wall, said flexible membrane having at least two portals such that adaptors can be inserted on flexible membrane;
    adaptors, fitted with stoppers to prevent adaptors be pulled out from the membrane during training, whereby surgical instruments passing through the openings of adaptors to manipulate simulated tissue or another operable structure on the base;
    a plain bearing set, including a bearing seat, a sleeve and a plain spherical bearing, whereby bearing seat installed on said face wall with bolts, whereby sleeve interference fitted in the shaft hole of the plain spherical bearing and having a bolt to fix the camera handle in place, whereby plain spherical bearing has an outer ring, inner spherical ring and shaft hole and having a bolt to fix the orientation of the plain spherical bearing;
    a camera handle, including a Webcam, hidden camera or CCD in front of handle, whereby camera handle is clearance fitted into sleeve of plain spherical bearing set be adjusted in and out and fixed in place with a bolt to catch the image of a simulated anatomical structure on the base.

2. The device of claim 1, wherein said upper wall extended upwardly and inwardly from front wall to form an angle greater than 90 degree.

3. The device of claim 2, wherein the angle between upper wall and front wall is further set to be between 110 degree and 165 degree.

4. The device of claim 1, further comprising a top wall which extended from upper wall and set about to parallel with the base for better blocking direct vision to the base.

5. The device of claim 1, wherein the flexible membrane attached on upper wall by bolts, rivets, staples or glue to simulate human tissue such as abdominal wall.

6. The device of claim 5, wherein said a strip piece or washer is placed between the flexible membrane and bolts, rivets or staples to press the flexible membrane on upper wall more evenly.

7. The device of claim 1, wherein said a distance between two portals of the flexible membrane is set around from 120 mm to 400 mm.

8. The device of claim 1, wherein said adaptors are trocars, cannulas or reducer caps used in laparoscopic surgery.

9. The device of claim 1, wherein said stopper has an outside dimension greater than the size of portal of the flexible membrane and has an inner dimension to be fitted on the adaptor such that adaptor can not be pulled out from flexible membrane during using the trainer.

10. The device of claim 9, wherein said stopper is interference fitted or/and secured with a bolt on the adaptor.

11. The device of claim 1, wherein the plain spherical bearing is interference fitted with the bearing hole of the bearing seat.

12. The device of claim 1, wherein the plain spherical bearing set is install on said face wall with bolts.

13. The device of claim 12, wherein the plain spherical bearing set is installed on said upper wall of the face wall.

* * * * *